US012649366B2

(12) United States Patent
Ragot et al.

(10) Patent No.: US 12,649,366 B2
(45) Date of Patent: Jun. 9, 2026

(54) BATTERY SYSTEM FOR A HEAVY-DUTY VEHICLE AND A HEAVY-DUTY VEHICLE COMPRISING SUCH A BATTERY SYSTEM

(71) Applicant: Volvo Truck Corporation, Gothenburg (SE)

(72) Inventors: Sebastien Ragot, Gothenburg (SE); Sondre Landvik, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 308 days.

(21) Appl. No.: 18/574,183

(22) PCT Filed: Jul. 2, 2021

(86) PCT No.: PCT/EP2021/068411
§ 371 (c)(1),
(2) Date: Dec. 26, 2023

(87) PCT Pub. No.: WO2023/274563
PCT Pub. Date: Jan. 5, 2023

(65) Prior Publication Data
US 2024/0253467 A1     Aug. 1, 2024

(51) Int. Cl.
*B60L 3/04*      (2006.01)
*B60K 1/04*      (2019.01)
(Continued)

(52) U.S. Cl.
CPC .................. *B60L 3/04* (2013.01); *B60K 1/04* (2013.01); *B60L 3/0046* (2013.01); *B60L 50/64* (2019.02);
(Continued)

(58) Field of Classification Search
CPC .......... B60L 3/04; B60L 3/0046; B60L 50/64; B60L 50/66; B60L 2200/40;
(Continued)

(56) References Cited

U.S. PATENT DOCUMENTS 5,163,537 A  * 11/1992 Radev ..................... B60L 50/66
                                                    180/68.5
5,373,910 A    12/1994 Nixon
                        (Continued)

FOREIGN PATENT DOCUMENTS

CN        110797493 A      2/2020
CN        213007576 U      4/2021
                        (Continued)

OTHER PUBLICATIONS

CN113022372 translation (Year: 2021).*
                        (Continued)

*Primary Examiner* — Timothy Hannon
(74) *Attorney, Agent, or Firm* — Withrow & Terranova, PLLC

(57)          ABSTRACT

A battery system for a heavy-duty vehicle, comprising at least one battery section which comprises a plurality of traction battery packs, a hold-and-release mechanism for connecting the battery section to the vehicle at a first point of connection and for enabling quick-release of the battery section from the vehicle in case of emergency, a towing attachment element connected to the battery section and presenting a second point of connection for receiving a towing device for transporting the battery section away from the vehicle by towing, after the hold-and-release mechanism has released the battery section from the vehicle, wherein the first point of connection is different from the second point of connection. The invention also relates to a heavy-duty vehicle comprising such a battery system.

8 Claims, 5 Drawing Sheets

(51) Int. Cl.

| | | |
|---|---|---|
| *B60L 3/00* | (2019.01) | |
| *B60L 50/60* | (2019.01) | |
| *B60L 50/64* | (2019.01) | |
| *F42B 3/00* | (2006.01) | |
| *H01M 50/204* | (2021.01) | |
| *H01M 50/249* | (2021.01) | |
| *H01M 50/262* | (2021.01) | |

(52) U.S. Cl.
CPC .............. *B60L 50/66* (2019.02); *F42B 3/006* (2013.01); *H01M 50/204* (2021.01); *H01M 50/249* (2021.01); *H01M 50/262* (2021.01); *B60L 2200/44* (2013.01); *H01M 2220/20* (2013.01)

(58) Field of Classification Search
CPC ... B60L 2200/44; F42B 3/006; H01M 50/204; H01M 50/249; H01M 50/262; H01M 50/244; H01M 50/256; H01M 50/258; B60K 2001/0455–0494
See application file for complete search history.

(56) References Cited

U.S. PATENT DOCUMENTS

| | | | |
|---|---|---|---|
| 2003/0070850 | A1 | 4/2003 | Reid et al. |
| 2007/0012496 | A1 | 1/2007 | Chene et al. |
| 2015/0053492 | A1* | 2/2015 | Kolatschek .............. B60K 1/04 180/68.5 |
| 2017/0229691 | A1* | 8/2017 | Loosen ............... H01M 50/262 |
| 2020/0384969 | A1* | 12/2020 | Huff ...................... B60T 11/108 |
| 2021/0078399 | A1 | 3/2021 | Remon Rodriguez |
| 2022/0009519 | A1* | 1/2022 | Shin ........................ B60L 53/80 |

FOREIGN PATENT DOCUMENTS

| | | | |
|---|---|---|---|
| CN | 113022372 | A | 6/2021 |
| DE | 102004047339 | A1 | 3/2006 |
| DE | 102013217865 | A1 | 3/2015 |
| DE | 112014004921 | T5 | 7/2016 |
| DE | 102018009106 | A1 | 5/2019 |
| DE | 102019004033 | A1 | 12/2020 |

OTHER PUBLICATIONS

International Search Report and Written Opinion for International Patent Application No. PCT/EP2021/068411, mailed Mar. 30, 2022, 17 pages.

* cited by examiner

BATTERY SYSTEM FOR A HEAVY-DUTY VEHICLE AND A HEAVY-DUTY VEHICLE COMPRISING SUCH A BATTERY SYSTEM

This application is a 35 USC 371 national phase filing of International Application No. PCT/EP2021/068411, filed Jul. 2, 2021, the disclosure of which is incorporated herein by reference in its entirety.

TECHNICAL FIELD

The invention relates to a battery system for a heavy-duty vehicle. The invention also relates to a heavy-duty vehicle comprising such a battery system.

The invention can be applied in heavy-duty vehicles, such as trucks, buses and construction equipment, etc.

BACKGROUND

Electric vehicle powered by traction batteries are gaining in popularity and are becoming more and more common. The batteries contain so much energy that if they start burning they will burn for many hours (even days), and due to the cell chemistry they can even reignite several days or weeks after they have been extinguished the first time. This makes towing and storing a damaged heavy-duty battery electric vehicle (BEV), such as a truck, difficult and dangerous.

On electric passenger cars, the fire brigade's safest solution is to lower the complete vehicle into a container filled with water. This will not only cool the batteries, but also ensure that they cannot reignite and create further damage. This is not doable with heavy duty vehicles, such as trucks, due to their size. If a battery pack is damaged and starts a thermal runaway, one could normally expect the complete truck, including its cargo, to be lost.

Thus, it would be desirable to provide a battery system which improves the chances of the heavy duty vehicle, including any cargo, to be saved, and which reduces the risk of further damage to the vehicle. This would also have the additional benefit of reducing the risk of surrounding infrastructure like bridges, tunnels, buildings, etc. becoming damaged, which could both save lives and save large amounts of money on damages.

SUMMARY

An object of the invention is to provide a battery system which at least partly mitigates the above-identified problems of battery-driven heavy duty vehicles. This and other objects, which will become apparent in the following discussion, are accomplished by a battery system.

The present general inventive concept is based on the realization that by providing two separate sets of attachment means, of which one is for attaching a battery section to the vehicle and the other one is for attaching the battery section to a towing device, and by providing a quick-release function for the first mentioned attachment means, the battery section may in case of emergency be swiftly released and towed away from the vehicle.

Thus, according to a first aspect of the present disclosure, there is provided a battery system for a heavy-duty vehicle, which battery system comprises:

at least one battery section which comprises a plurality of traction battery packs, a hold-and-release mechanism for connecting the battery section to the vehicle at a first point of connection and for enabling quick-release of the battery section from the vehicle in case of emergency, a towing attachment element connected to said battery section and presenting a second point of connection for receiving a towing device for transporting the battery section away from the vehicle by towing, after the hold-and-release mechanism has released the battery section from the vehicle, wherein said first point of connection is different from said second point of connection.

By the provision of a towing attachment element which is spatially separated from the hold-and-release mechanism, a towing device may be attached/connected to the towing attachment element substantially simultaneously with the activation of the hold-and-release mechanism. Put differently, the time frame for unlatching the battery section from the vehicle and also towing the battery section away from the vehicle can be reduced, thereby increasing the chances of saving the rest of the vehicle, including any cargo.

The plurality of traction battery packs may suitably be joined together in the longitudinal direction of a frame member of the chassis of a vehicle, to form a battery section. Suitably, both the left side and the right side of the vehicle may contain one or more such battery sections.

The hold-and-release mechanism enables a quick-release of the battery section. Thus, unlike traditional connections of battery sections, which requires time consuming operations for disconnecting the battery sections from the vehicle, such as by unscrewing bolts or the like, the quick-release functionality of the present hold-and-release mechanism avoids such time-consuming operations.

The hold-and-release mechanism may be of any suitable type which allows quick release. For example, it may include a pyrotechnic fastener which may have an activation mechanism that burns or deflagrates on command. In other examples, the hold-and-release mechanism may be purely mechanical, wherein a part of it may be easily broken if a certain force is applied to the hold-and-release mechanism. An example is a hold-and-release mechanism that includes a rod which may be broken when a radial force is applied to the rod. In some example embodiments, the hold-and-release mechanism may have a locally weakened portion to facilitate the breaking of the mechanism and thus the release of the battery section.

According to at least one exemplary embodiment, the battery section has an inboard side configured to face the central longitudinal axis of the vehicle when the battery section is mounted to the vehicle, an outboard side configured to face away from the central longitudinal axis, a bottom side configured to face towards the ground, and a top side configured to face away from the ground, wherein the towing attachment element is provided on the outboard side, the bottom side or the top side. Battery sections normally have a predefined orientation with respect to the vehicle, since it has electrical connectors and other items which need to be coupled to the vehicle. By having the towing attachment element on a side which is easily accessible, a towing device can be quickly connected to the towing attachment element. Normally, the outboard side, the top side and the bottom side are relatively easily accessible, while the inboard side is not.

According to at least some exemplary embodiments, the towing attachment element is in the form of a bracket, a loop or an eyelet, configured to receive a towing device in the form of a tow hook or in the form of a rope or wire threaded through the towing attachment element. Thus, the towing attachment element suitably has an opening, such as a through hole, for connecting a towing device, such as by latching, gripping, threading, by providing a knot, etc.

The hold-and-release mechanism may be located in various locations. For instance it can be provided at the inboard side of the battery section. In such case, the hold-and-release-mechanism may suitably comprise a pyrotechnic fastener, which may be activated from remote from a button or other type of user interface. In other exemplary embodiments, at least a part of the hold-and-release mechanism may suitably be located on the outboard side. This has the advantage of the hold-and-release mechanism being easily accessible. For example, as will be discussed further below, it may be possible to configure the system such that the pulling of a towing device may cause the hold-and-release mechanism released the battery section from the vehicle as well as causing the battery section to be towed away from the vehicle.

Thus, in a general sense, according to at least one exemplary embodiment, the hold-and-release mechanism is configured to become activated to release the battery section by a pulling action of a towing device connected to the towing attachment element. The towing device may, for instance, have several sets of connecting means, such as one for the hold-and-release mechanism and one of the towing attachment element. In other exemplary embodiments, the towing device may only be connected to the towing attachment element, which in turn may be linked to the hold-and-release mechanism such that a pulling force from the towing device will via a linkage also affect and active the hold-and-release mechanism to release the battery section.

According to at least one exemplary embodiment, the hold-and-release mechanism comprises a fastening element, which is configured to be broken when the hold-and release mechanism is subjected to a force that exceeds a predetermined threshold force. Thus, the hold-and-release mechanism may suitable be designed, configured and dimensions such that under normal use, it holds the battery section in a secure manner to the vehicle, but if the hold-and-release mechanism, or a specific part, thereof, is subjected to a force which exceeds, the predetermined threshold force, then the battery section will be released. In some exemplary embodiments, the part of the hold-and-release mechanism that is to be broken, may be directly subjected to said force by an external device which is not part of the hold-and-release mechanism. For instance, the external device may form part of a towing device, or some other device for providing said force. In other exemplary embodiments, the part of the hold-and-release mechanism that is to be broken may be subjected to said force by another part of the hold-and-release mechanism, wherein said another part is configured to transmit or convert a force to which said another part is subjected. Thus, the breaking force may be direct or indirect.

According to at least one exemplary embodiment, said force that exceed the predetermined threshold force is a rotational force applied to a part of the hold and release mechanism. This may be advantageous, as the hold-and-release mechanism may be dimensioned to withstand large forces in other directions which may be desired to securely hold the battery section in place. Similarly, the hold-and-release mechanism may be dimensioned such that in the event of emergency a rotational force (to which a part of the release mechanism is not subjected to under normal operation), may cause said part to break so as to release the battery section. For instance, in some exemplary embodiments, the hold-and-release mechanism may include a threaded rod which in combination with an engaging nut or similar fastener may hold the battery section in place. In such cases, the threaded rod will be designed to withstand the axial and radial forces to which it is subjected-to under normal operating conditions, however, a part which is normally not subjected to any rotational, such as radial forces, may break if such rotational or radial forces are larger than the predefined threshold force.

It should be understood that in any hold-and-release mechanism of the present inventive concept, the herein discussed threshold force may be designed by, for example, selecting the type of material of a part of the hold-and-release mechanism, selecting dimensions such as thickness of such a part, etc.

According to at least one exemplary embodiment, the hold-and-release mechanism comprises a mounting bracket connected to said fastening element, wherein the mounting bracket is configured to function as a lever when subjected to said force, resulting in breaking of the fastening element. Put differently, the mounting bracket may be function similarly to a bottle opener which removes a cap from a bottle. This is advantageous as it is an easy way to activate the release function of the hold-and-release mechanism. The mounting bracket may suitably be subjected to a pulling force at a location spaced from its points of contact with the fastening element, causing it to start rotating around said points of contact and eventually the rotating force will break the fastening element. This is at least partly reflected in the following exemplary embodiment.

According to at least one exemplary embodiment, the fastening element comprises a rod extending through the mounting bracket, wherein the mounting bracket is locked to the rod and the battery section by a nut engaged with the rod, wherein the rod is configured to break when the mounting bracket is subjected to said force. This is advantageous as the rod provides a natural centre of rotation for the bracket when the mounting bracket is pulled away from the battery section. Clearly, this provides a much quicker way to release the battery section than to unscrew the nut from the rod (considering that the nut must be tightly engaged with the rod and the battery section for securing the battery section under normal operation). The mounting bracket may be caused to rotated by pulling it directly or indirectly. For instance, it can be pulled indirectly in embodiments, in which it is mechanically linked to the towing attachment element. This is at least partly reflected in the following exemplary embodiment.

According to at least one exemplary embodiment, the towing attachment element is mechanically linked to the hold-and-release mechanism, such that a towing force above a predefined value applied to the towing attachment element results in the hold-and-release mechanism being subjected to said force that exceeds said predetermined threshold force. This is advantageous since only one connecting operation is required with an external device, i.e. in this case with a towing device. In other exemplary embodiments, the hold-and-release mechanism (for example said mounting bracket) is connected by one connecting operation and the towing attachment element is connected by another connecting operation, which may also be advantageous as it may be easier to control the actual force applied to the respective component.

According to at least one exemplary embodiment, said at least one battery section comprises a first battery section configured to be installed on the left side of the vehicle, and a second battery section configured to be installed on the right side of the vehicle, wherein the hold-and-release mechanism comprises a rod interconnecting the first and the second battery sections, wherein breaking of the rod results in the battery sections being released and ready to be towed away from the vehicle. This is advantageous as both battery sections can be released at the same time. Suitably, the rod protrudes out from at least one of the first and second battery sections and the protruding portion is engaged by a locking nut preventing the battery sections to be removed from the rod. By breaking the protruding part of the rod such that the protruding part and the engaged nut are separated from the rest of the rod, the battery section can be pulled of the rod and the first and second battery sections may be towed in a respective direction away from the vehicle. The protruding part of the rod may suitably protrude through a mounting bracket provided on the side of the battery section, wherein the locking nut is tightened against the mounting bracket. The mounting bracket may be used as a lever to break the protruding part of the rod.

According to a second aspect of the present disclosure, there is provided a heavy-duty vehicle comprising a battery system according to the first aspect, including any embodiment thereof. The advantages of the heavy-duty vehicle of the second aspect largely correspond to the advantages of the battery system of the first aspect, including any embodiment thereof.

The vehicle may suitably be provided with one or more battery sections on both the left side and the right side of the vehicle. In some exemplary embodiments, a connection between a battery section on the left side and a battery section on the right side may be established with a joint (screw, rod, etc.) which may include a nut on the outer side of the vehicle. The battery sections are then well attached to the vehicle during driving and operation.

The vehicle may suitably have the one or more battery sections installed on the chassis in the wheelbase area. However, the general inventive concept may be implemented also for other locations of the battery section.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
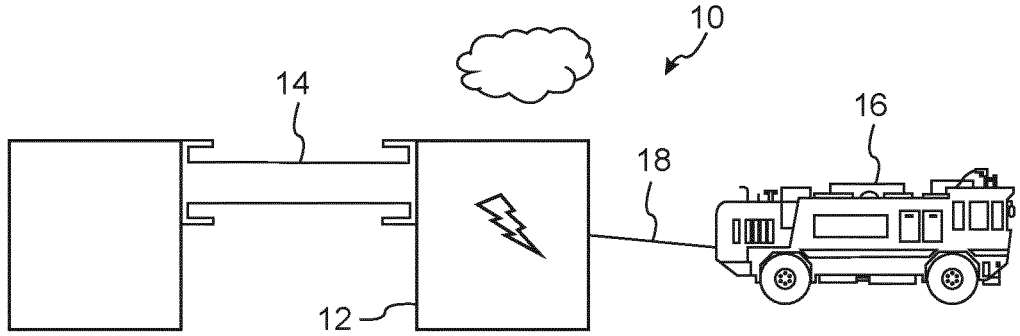
FIGS. 1-4 illustrate a sequence for towing away a battery section, the battery section forming part of a battery system according to at least one exemplary embodiment of the present invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIGS. 1-4 illustrate a very schematic sequence for removing a battery section 12 from a vehicle in an emergency event, such as in the event of fire or potential fire. More specifically, FIGS. 1-4 illustrate a sequence for towing away a battery section 12, the battery section 12 forming part of a battery system 10 according to at least one exemplary embodiment of the present invention. The battery section 12 is herein illustrated as being attached a chassis 14 of the vehicle.

The battery section 12 may, for instance, have been damaged, either due to an external event such as a collision or similar, or due to an internal even such as short circuit or overload.

In a first step, as illustrated in FIG. 1, the fire fighters 16 assess the situation and decide to remove the battery section 12 in order to protect the vehicle, payload and/or surroundings (they may suitably also decide to remove the battery section on the other side of the chassis, left side in the drawing). Then they attach a towing device 18, such as a towing cable to the battery section. More specifically, they attach the towing device 18 to a towing attachment element (not shown in FIGS. 1-4) provided on said battery section 12.

Figure 2:
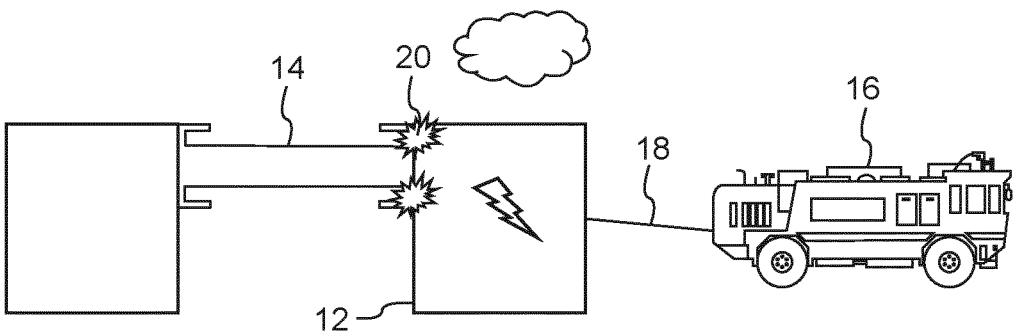

Next, as illustrated in FIG. 2, one or more hold-and-release mechanisms 20 (two illustrate in this figure) are activated to release the battery section 12. The hold-and-release mechanism 20 are here illustrated as being of the pyrotechnic type, however, other hold-and-release mechanisms can, of course, be used. As is clear from FIG. 2, the hold-and-release mechanisms 20 for connecting the battery section 12 to the vehicle (in this example to the chassis 14 of the vehicle) are located at first points of connection, while the towing attachment element presents a second point of connection, which is at a different location, for receiving the towing device 18.

Figure 3:
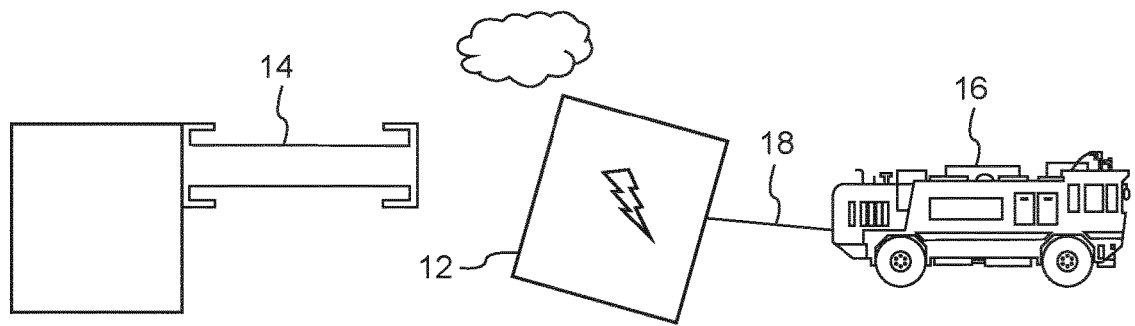
Figure 4:
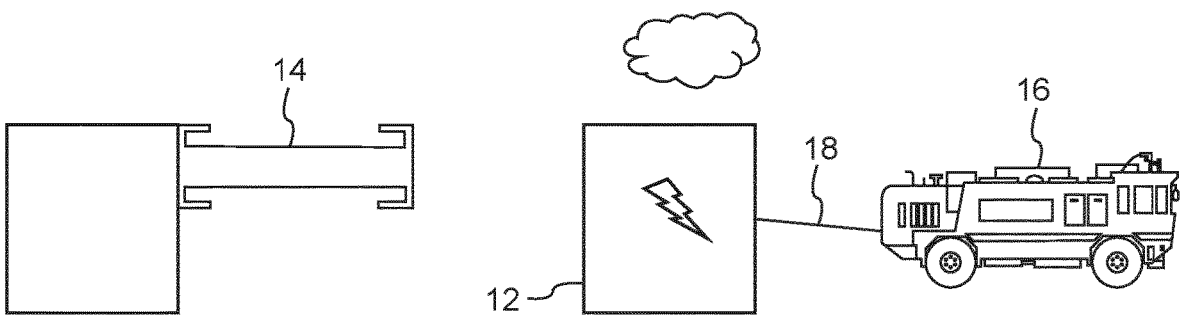

The battery section 12 is thus released and can be towed away by pulling at the towing attachment element. This is illustrated in FIGS. 3 and 4.

FIGS. 5-11 illustrate another sequence for removing a battery section 52 from a vehicle in an emergency event. More specifically, FIGS. 5-11 illustrates another sequence for towing away a battery section 52, the battery section 52 forming part of a battery system 50 according to at least another exemplary embodiment of the present invention.

Figure 5:
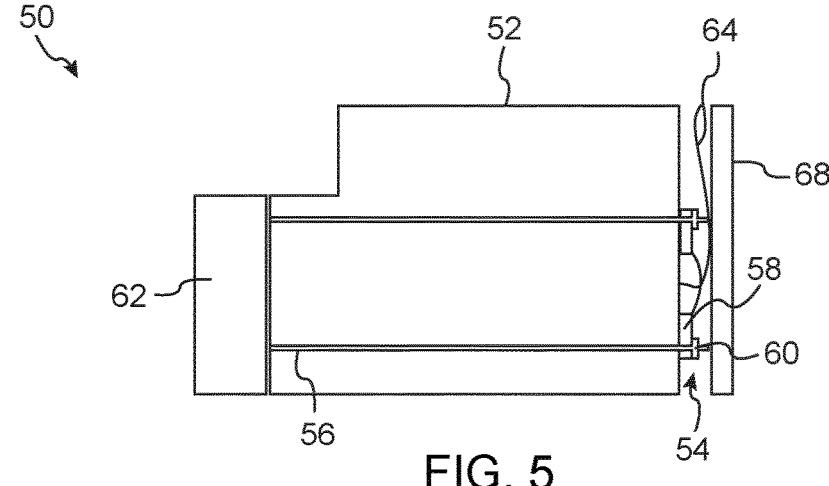
FIGS. 5-11 illustrates another sequence for towing away a battery section, the battery section forming part of a battery system according to at least another exemplary embodiment of the present invention.

Thus, starting with FIG. 5, it illustrates a battery system 50 for a heavy-duty vehicle, in accordance with another exemplary embodiment of the present inventive concept. The battery system 50 comprises a battery section 52 which comprises a plurality of traction battery packs. The battery system 50 also comprises at least one hold-and-release mechanism 54 for connecting the battery section 52 to the vehicle at a first point of connection and for enabling quick-release of the battery section 52 from the vehicle in case of emergency. In the present exemplary illustration, the battery system 50 comprises two hold-and-release mechanisms 54, however, in other exemplary embodiments there may be just a single hold-and release mechanism or there may be three or more hold-and-release mechanisms.

In FIG. 5, it can be seen that in this exemplary embodiment, each hold-and-release mechanism 54 comprises a plurality of components, including a rod 56, a mounting bracket 58 and a nut 60. The rod 56 extends all the way through the battery section 52. On the inboard side the rod extends to a structure 62 to which it is connected. The structure 62 is here schematically illustrated simply as a block. However, it should be understood that the structure 62 may represent various different options. For instance, the structure 62, may be part of the chassis of the vehicle, or may be part of a component connected to the chassis. In some exemplary embodiments, the structure 62 may represent another battery section just like the battery section 52 illustrated in FIG. 5. Thus, in such cases, the battery system 50 may comprise two battery sections, one on the left side of the vehicle and one on the right side of the vehicle, wherein the or each hold-and-release mechanism 54 comprises a rod 56 which extends through both battery sections, and which is engaged with a mounting bracket 58 and a nut 60 on the outboard side of the respective battery section 52.

As can be seen in FIG. 5, the end of the rod 56 protrudes from the outboard side of the battery section 52 to extend through and beyond the mounting bracket 58. The end of the rod 56 is suitably threaded, wherein the nut 60 having mating threads can be screwed onto the end of the rod 56 and tightened. The mounting bracket 58 thus becomes clamped between the nut 60 and the battery section 52. Contrary to the illustration in FIG. 1, wherein the hold-and-release mechanism 20 was indicated as being present on the inboard side, it is clear that in FIG. 5, the holding force, is achieved by the tightened nut 60 on the outboard side. Thus, in FIG. 5, said first point of connection of the battery section 52 is considered to be at the bracket/nut 58/60 near the end of the rod 56.

The battery system 50 shown in FIG. 5 also comprises a towing attachment element 64, here illustrated in the form of a loop 64 of a wire. The towing attachment element 64 presents a second point of connection for receiving a towing device for transporting the battery section 52 away from the vehicle by towing. The loop 64 is connected via the rest of the wire to the battery section 52, and is well fastened to the battery section 52. In this exemplary embodiment, the wire also has two additional end pieces 66 (seen more clearly in FIG. 6), connected to a respective mounting bracket 58. Thus, in this exemplary embodiment, although said first and second connection points are spatially separated, they are in this exemplary embodiment, mechanically linked (the first connection points being at the mounting brackets 58, and the second connection point being the loop 64). As will be explained, after the loop 64 (i.e. the towing attachment element) has received a towing device such as a towing cable (e.g. with an end hook), the release and towing of the battery section 52 can basically be handled in one common operation. It should, however, be understood that in other exemplary embodiments, the towing attachment element and the hold-and-release mechanism are not mechanically linked and are in such embodiments therefore handled separately.

As schematically illustrated in FIG. 5, the vehicle may suitably have a crash shield or fairing 68, for example for protective and/or aerodynamic purposes. The crash shield or fairing 68 as such, however, does not form part of the general inventive concept. Indeed the general inventive concept may also be implemented for a vehicle without such a crash shield or fairing.

It should be understood that although the towing attachment element 64 (and also the hold-and-release-mechanism 54) are indicated as being located on the outboard side of the battery section 52 (i.e. the side facing away from the centre of the vehicle), other alternative locations for the towing attachment element 64 may, for instance, be the bottom side (facing the ground) or the top side (facing away from the ground) of the battery section 52.

Figure 6:
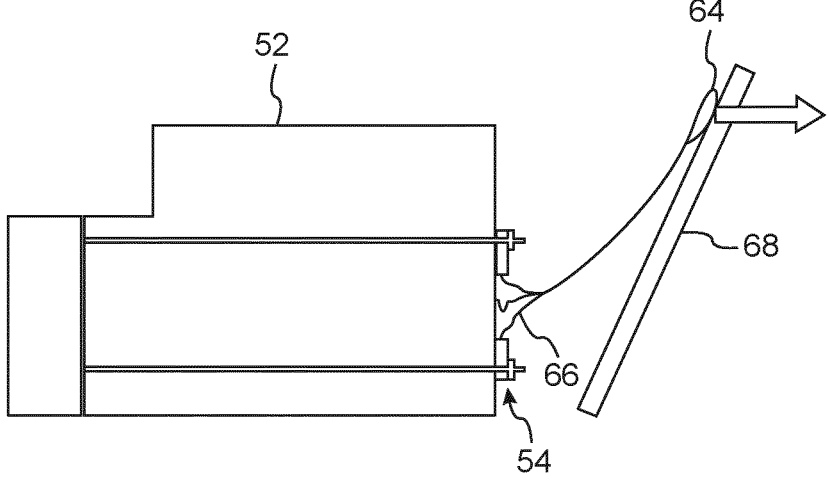
Figure 7:
Figure 8:
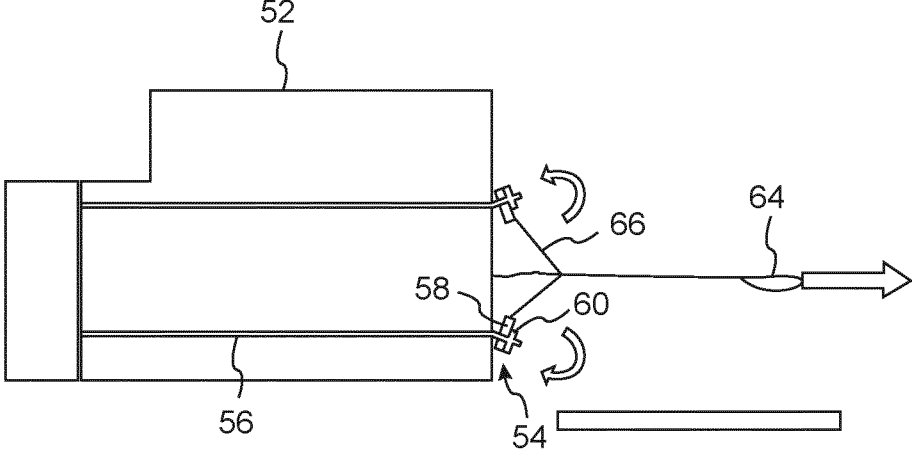

FIG. 6 illustrates that after a towing device (not shown) has been connected to the towing attachment element 64, an initial small pulling force is applied (illustrated by the horizontal arrow). This rips off the attachments (not shown) for the crash shield or fairing 68, thus exposing the hold-and-release mechanism 54. When the crash shield or fairing 68 has fallen off, the wire is extended fully, and a larger force is applied to start the releasing of the battery section 52. The releasing is quite similar to that of a "bottle cap opening mechanism" and is illustrated in FIGS. 7-8. The higher force on the towing cable, which pulls the towing attachment element 64, which in turn via the end pieces 66 of the wire pulls the mounting brackets 58. The mounting brackets 58 will act as lever arms underneath the nuts 60, as illustrated in FIG. 8. This forces the normally strong connection to bend. The end of the rod 56 with the engaged nut 60 becomes separated by means of the rotating force (illustrated by the curved arrows) of the mounting bracket 58. As understood from above, the nut 60 and the rod 56 are configured to cooperate with each other to hold the battery section 52 in place, and they thus form part of a fastening element. This fastening element is configured to be broken when the hold-and-release mechanism 54 is subjected to a force that exceeds a predetermined threshold force. In this case, when the towing device pulls the towing attachment element 64 the mounting bracket 58 will be subjected to a rotating force. When this rotating force is large enough, i.e. larger than a threshold force, the resulting force on the rod 56 will be enough to break it. Since the towing attachment element 64 is mechanically linked to the hold-and-release mechanism 54 in this exemplary embodiment, a towing force above a predefined value applied to the towing attachment element 64 will result in the hold-and-release mechanism 54 being subjected to said force that exceeds said predetermined threshold force.

Figure 9:
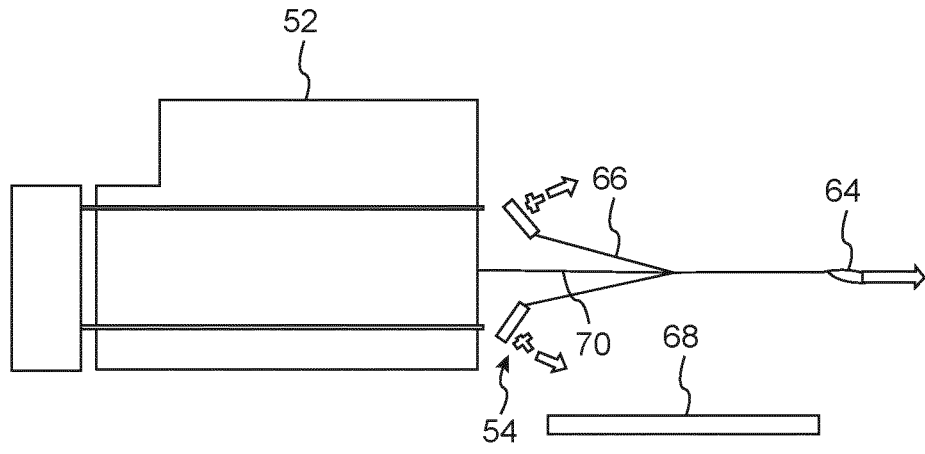
Figure 10:
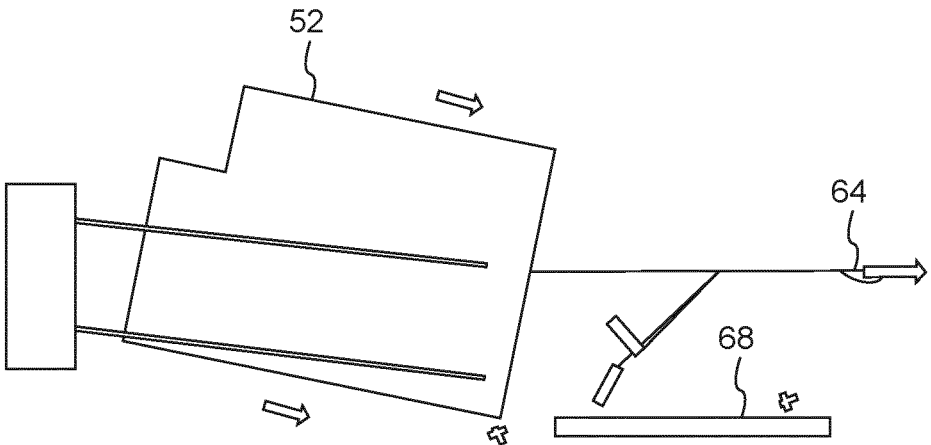
Figure 11:
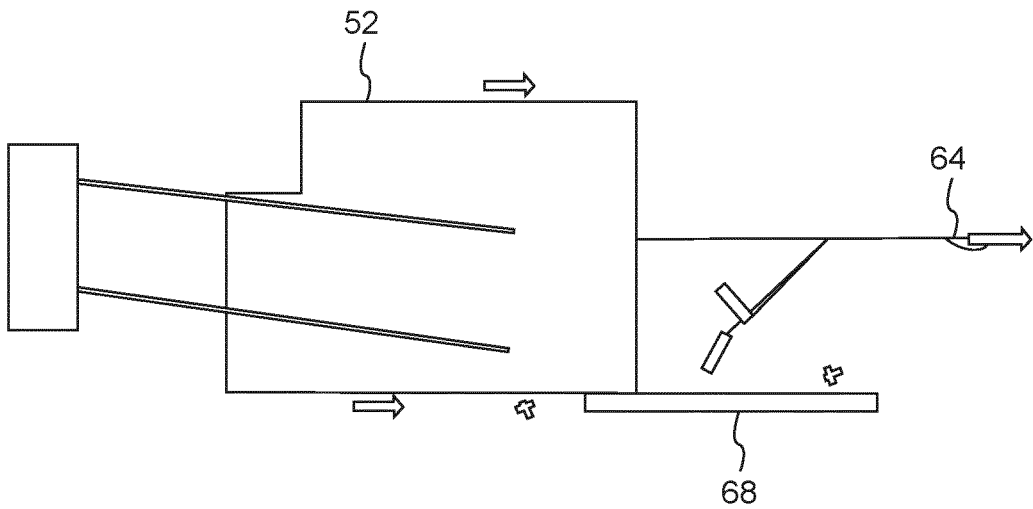

As illustrated in FIG. 9, after the rod 56 has been broken off and the towing device continues pulling the towing attachment element 64, the wire end piece 70 connected directly to the battery section 52 becomes fully extended. The battery section 52 is now no longer fixedly attached to the vehicle and can be towed directly outwards to release it from the chassis side. The battery section will slide off the rods (FIG. 10) and reach the ground from where it can be towed to safety (FIG. 11).

In exemplary embodiments in which said schematically illustrated structure 62 is a corresponding battery section on the other side of the vehicle, it can of course be towed away simultaneously with the battery section 52 shown in the figures.

Figure 12:
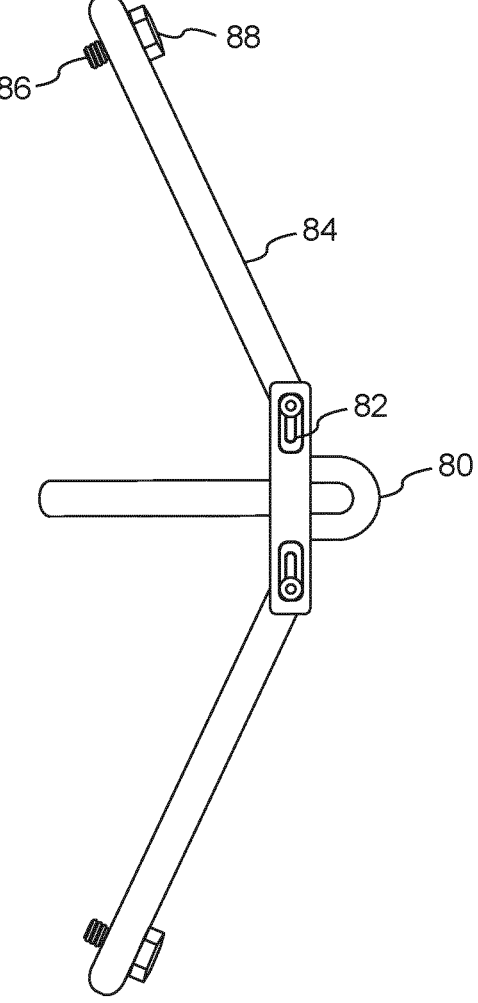
FIG. 12 illustrates details of a battery system according to at least yet another exemplary embodiment of the present invention.

FIG. 12 illustrates details of a battery system according to at least yet another exemplary embodiment of the present invention. FIG. 12 schematically illustrates a towing attachment element 80. Instead of a loop connected to the battery section via a wire, the towing attachment element 80 is in the form of a hook, such as a metallic hook. The towing attachment element 80 may also include slots 82 for the mounting brackets 84 (or similar elements) to slide in. In this exemplary embodiment, when the towing attachment element 80 is pulled by a towing device, this hinged connection will make the mounting brackets 84 slide in the slots 82, and perform a rotating motion similar to the wire embodiment shown previously in FIGS. 5-11. In the exemplary embodiment of FIG. 12, the rotation of the mounting brackets 84 will cause the rod 86 with the nut 88 to brake (only the broken-off end of the rod 86 is shown).

The invention claimed is:

1. A battery system for a heavy-duty vehicle, comprising:

at least one battery section which comprises a plurality of traction battery packs;

a hold-and-release mechanism for connecting the battery section to the vehicle at a first point of connection and for enabling quick-release of the battery section from the vehicle in case of emergency; and a towing attachment element connected to the battery section and presenting a second point of connection for receiving a towing device for transporting the battery section away from the vehicle by towing, after the hold-and-release mechanism has released the battery section from the vehicle;

wherein the first point of connection is different from the second point of connection;

wherein the hold-and-release mechanism comprises a fastening element, which is configured to be broken when the hold-and-release mechanism is subjected to a force that exceeds a predetermined threshold force;

wherein the hold-and-release mechanism comprises a mounting bracket connected to the fastening element, wherein the mounting bracket is configured to function as a lever when subjected to the force, resulting in breaking of the fastening element.

2. The battery system of claim 1, wherein the battery section has an inboard side configured to face a central longitudinal axis of the vehicle when the battery section is mounted to the vehicle, an outboard side configured to face away from the central longitudinal axis, a bottom side configured to face towards the ground, and a top side configured to face away from the ground, wherein the towing attachment element is provided on the outboard side, the bottom side or the top side.

3. The battery system of claim 1, wherein the towing attachment element is in the form of a bracket, a loop or an eyelet, configured to receive the towing device in the form of a tow hook or in the form of a rope or a wire threaded through the towing attachment element.

4. The battery system of claim 1, wherein the force is a rotational force applied to a part of the hold-and-release mechanism.

5. The battery system of claim 1, wherein the fastening element comprises a rod extending through the mounting bracket, wherein the mounting bracket is locked to the rod and the battery section by a nut engaged with the rod, wherein the rod is configured to break when the mounting bracket is subjected to the force.

6. The battery system of claim 1, wherein the towing attachment element is mechanically linked to the hold-and-release mechanism, such that a towing force above a predefined value applied to the towing attachment element results in the hold-and-release mechanism being subjected to the force that exceeds the predetermined threshold force.

7. The battery system of claim 1, wherein the hold-and-release mechanism comprises pyrotechnic fasteners configured to release the battery section from the vehicle.

8. A heavy-duty vehicle comprising the battery system of claim 1.

* * * * *